United States Patent Office 3,051,549
Patented Aug. 28, 1962

3,051,549
CONTINUOUS MANUFACTURE OF CALCIUM CYANAMIDE
Thomas Fischer, Trostberg, Franz Kaess, Traunstein, and Hermann Kronacher, Trostberg, Germany, assignors to Suddeutsche Kalkstickstoff-Werke Aktiengesellschaft, Trostberg, Germany
No Drawing. Filed Mar. 29, 1960, Ser. No. 18,228
Claims priority, application Germany Apr. 1, 1959
3 Claims. (Cl. 23—78)

The invention relates to the manufacture of calcium cyanamide.

In the continuous manufacture of calcium cyanamide from powdery calcium carbide in rotary kilns, it is known to admix calcium cyanamide to the carbide powder in order to reduce caking of the powder and adhesion to the walls of the furnace. Nevertheless, the formation of lumps and caking was difficult to prevent, and various proposals have been made to overcome said drawbacks.

We have found that better results than heretofore are accomplished when the added calcium cyanamide is of greater fineness than the calcium carbide powder. If, for instance, the carbide powder has a 65–80 percent minimum through a sieve of 10,000 mesh/sq. cm., the particles of the added calcium cyanamide powder must have a fineness of 70 to 93% minimum. From these figures, it will be seen that the fineness of the calcium cyanamide should be at least about 5 percent greater than that of the calcium carbide.

The finer disintegration of the added calcium cyanamide, compared with the calcium carbide, has not only the advantage to protect the oven walls by the calcium cyanamide powder against baking of the carbide but increases also the rate of the nitrogenating reaction.

As a result of said accelerating effect, the calcium chloride otherwise required in the kiln process as a catalyst may be completely replaced by the cheaper and non-hygroscopic fluorspar in such low amounts as possible heretofore only in discontinuous operation.

The carbide and calcium cyanamide may be introduced in the kiln simultaneously.

The fine calcium cyanamide powder used for the method of the invention may be obtained in various ways. We prefer to use wind-sifted calcium cyanamide, which may be obtained by such sifting after passage of calcium cyanamide through a conventional mill. A similar fine powder may be obtained by means of very fine screens or by fine milling.

The following examples are given to illustrate the invention:

Example 1

A 80% $CaC_2$ was used having a fineness of 70 percent minimum through a 10,000 mesh/sq. cm. sieve. 3.3 large tons per hour of said carbide were passed with about 1650–1700 m.³/hour of nitrogen gas into a rotary kiln at reaction temperature of about 1000° C. and containing a calcium cyanamide bed.

To the carbide flour, there were admixed per hour 0.04 tons of fluorspar and 2 tons of wind-sifted calcium cyanamide from a previous production, which calcium cyanamide had a minimum fineness of 85 percent through a 10,000 mesh sieve. The amount of added calcium cyanamide was so controlled as to maintain the temperature of the kiln at substantially 1000° C.

The daily output of the kiln was about 25 large tons of bound nitrogen, corresponding to a production of about 125 tons per day of a calcium cyanamide containing 20.5 percent of N.

Example 2

The kiln of Example 1 was used to nitrogenate a mixture of calcium carbide and calcium cyanamide powder under otherwise the same conditions as set forth in Example 1, where over an extended period of time calcium carbide powder, 71% minimum through 10,000 mesh/sq. cm. sieve, was first admixed with calcium cyanamide powder of the same particle size, and then with calcium cyanamide powder, 92% minimum through the same sieve. The time of standstill necessary for cleaning the rotary kiln was in the second case about 50 to 100 percent less than in the first case.

We claim:
1. A method of the continuous manufacture of calcium cyanamide in a rotary kiln comprising passing powdered calcium carbide and nitrogen through a rotary kiln, adding to said calcium carbide powder calcium cyanamide powder of at least 15% higher fineness than said calcium carbide powder, and adjusting the amount of said added calcium cyanamide powder so as to maintain the temperature of the material at about 1000° C.
2. The method as claimed in claim 1, wherein the fineness of the calcium carbide powder is about 65 to 80 percent minimum through a 10,000 mesh/sq. cm. sieve.
3. The method as claimed in claim 1, wherein said calcium cyanamide powder is obtained by wind-sifting of the reaction product.

References Cited in the file of this patent
UNITED STATES PATENTS

| | | |
|---|---|---|
| 1,004,509 | Washburn | Sept. 26, 1911 |
| 2,180,382 | Winter et al. | Nov. 21, 1939 |
| 2,886,417 | Kaess et al. | May 12, 1959 |
| 2,917,371 | Fischer et al. | Dec. 15, 1959 |